United States Patent [19]
Vaccaro

[11] 3,747,044
[45] July 17, 1973

[54] MICROWAVE INTEGRATED CIRCUIT (MIC) GROUND PLANE CONNECTOR

[75] Inventor: Frank Emelio Vaccaro, East Brunswick, N.J.

[73] Assignee: RCA Corporation, New York, N.Y.

[22] Filed: Aug. 19, 1971

[21] Appl. No.: 173,077

[52] U.S. Cl. ....... 339/14 R, 200/16 R, 317/101 CC, 339/17 E, 339/19

[51] Int. Cl. ....... H01r 3/06

[58] Field of Search ....... 339/14, 252, 221, 339/17 E, 18 R, 19, 278 C; 200/11 G, 11 K, 166 BE, 166 BF; 317/100, 101 A, 101 CC, 101 CE

[56] References Cited

UNITED STATES PATENTS

| | | | |
|---|---|---|---|
| 3,591,834 | 7/1971 | Kolias | 317/101 CC |
| 3,389,305 | 6/1968 | Bond | 317/100 |
| 3,623,127 | 11/1971 | Glenn | 200/16 R |
| 2,927,985 | 3/1960 | Rivers | 200/104 |
| 3,330,930 | 7/1967 | Hill et al. | 200/16 BE |
| 3,567,891 | 3/1971 | Hinkelmann | 200/166 |

OTHER PUBLICATIONS

A. S. M. Metals Handbook, 1948, p. 897
Metals Handbook, 1961, p. 974

*Primary Examiner*—Marvin A. Champion
*Assistant Examiner*—Robert A. Hafer
*Attorney*—Edward J. Norton

[57] ABSTRACT

Electrical connector formed of a beryllium copper spring metal and situated to make electrical connection between the ground planes of separate MIC substrates. The connector is resiliently seated in retaining slots in the base of the housing and formed to extend above the plane of the base in which the grooves are formed to make contact between ground planes of the separate MIC substrates. The spring metal is formed with a heat treatment to provide hardness and spring tension that assures a reliable electrical connection.

5 Claims, 4 Drawing Figures

INVENTOR.
FRANK E. VACCARO
BY Joseph D Lazar
ATTORNEY

INVENTOR.
FRANK E. VACCARO
BY
Joseph D Lazar
ATTORNEY

MICROWAVE INTEGRATED CIRCUIT (MIC) GROUND PLANE CONNECTOR

The invention herein described was made in the course of or under a contract of subcontract thereunder with the Department of the Air Force.

BACKGROUND OF THE INVENTION

This invention relates to electrical connectors and, more particularly, to devices for carrying microwave energy.

In the manufacture of microwave integrated circuit (MIC) systems the substrates serving as circuits for the component amplifiers and the like require that electrical contact be made between the ground planes of the separate substrate of the components. This requirement of good electrical contact is especially important in the region or portion of the module immediately under a conductor or line carrying the microwave energy from one component to another. A poor electrical ground plane contact or an electrical contact that is not directly under the conductor or line carrying the radio frequency (RF) energy will result in undesirable circuit performance if, indeed, the circuit operates at all. In addition, the electrical contacts in such modules must allow for dimensional changes due to the differences in thermal expansion between the substrate and the metal base when severe temperature variations are imposed upon MIC systems.

SUMMARY OF THE INVENTION

According to the invention an electrical connector formed of a spring metal made of a beryllium-copper alloy is heat treated and then formed into a groove in the base supporting the substrates. Amplifiers or other electronic component requiring electrical ground contact to each other are inserted into the housing to exert a deforming force on the spring contact nested in the groove. The electrical connection between the ground planes of the components established by the deformed spring allows for sliding movement even with repeated replacement of the amplifier within the housing and assures a reliable electrical contact between ground planes. The treated spring connector allows for thermal expansion and contraction so that changes in dimensions between the substrate and modules components do not cause a break or interruption in the electrical connection.

DETAILED DESCRIPTION OF A PREFERRED EMBODIMENT

Figure 1:
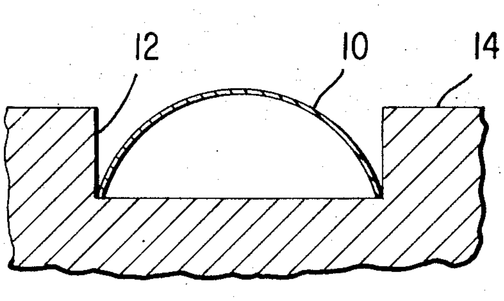
FIG. 1 is a side elevation view of an electrical connector according to the invention shown in place within a groove in the base of the housing.
Figure 2:
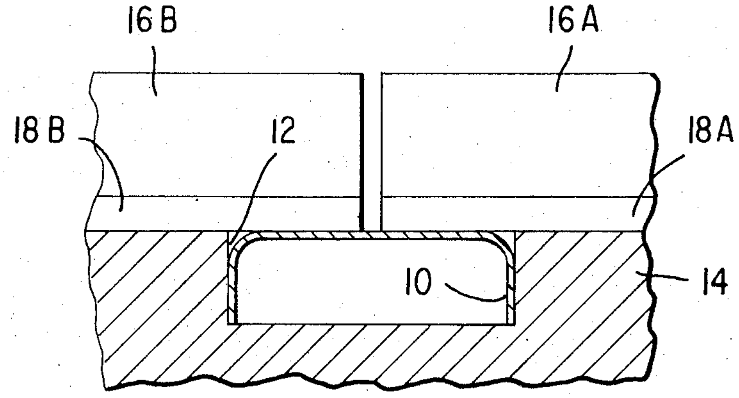
FIG. 2 is a side elevation view of the electrical connector shown in position with substrates positioned above it to establish electrical ground connection with each other.

Referring now to the drawing in FIG. 1, an electrical connector 10 of semi-cylindrical form is shown nested in a groove 12 formed in a housing base 14 of solid aluminum. FIG. 2 illustrates the connector 10 deformed within the groove 12 by a pair of substrates 16A and 16B each having a metalized portion 18A and 18B, respectively. The metalized portions 18A and 18B of the substrate represent the ground planes of the substrates 16A and 16B which are required to be connected to each other. The connector 10 as shown in FIG. 1 protrudes above the surface of the base 14 and is so shaped as to exert a slight pressure on the walls of the slot 12 when deformed to the shape shown in FIG. 2.

The arc of the connector 10 as seen in FIG. 1 is such as to extend above the surface of the base 14 sufficiently so that when deformed under a vertical force it will fill the slot 12 in the base 14 as seen in FIG. 2.

The preferred material for making the connector 10 is an alloy of beryllium and copper commerically available in spring metal with a thickness of 0.0006 inches and a width depending upon the length of the slot 12 that is formed in the base 14. The width of the connector, i.e. the dimension into the paper of FIGS. 1 and 2, is determined by the requirements of the particular application of the circuit module that is to be grounded. The connector 10 is treated to develop the required resilience as well as the necessary hardness by heating and quenching. It is preferred to be heated to 320° C. for one hour in air and then water quenched.

Other materials that may be used for the connector 10 is the commercially available Inconel-x sold by the International Nickel Company. This material is an alloy of Indium, copper, and nickel. It is also treated in a manner similar to that just described for the beryllium copper connector.

In general, the electrically conductive material used for the connector 10 must be resilient enough to be deformed from the general shape shown in FIG. 1 to that shown in FIG. 2 and yet restore itself to the original shape when the substrate is removed.

Heretofore, the manner of establishing an electrical ground between substrates and a ground plane was accomplished by a variety of means none of which have proven to be entirely satisfactory. For example, a mass of steel wool inserted in a slot such as a slot 12, illustrated in FIGS. 1 and 2, has been used to provide an electrical ground connection. Such a means, sometimes known as a "fuzz-button", was found not to be resilient after repeated use and caused improper grounding. Resilient finger connectors have been used but their geometry is not suitable for use when substrates are supported on a flat metal base.

The connector of the present invention has been found to be a reliable connector that has maintained electrical connection between the ground planes repeatedly without failure.

A heat sink for the module is preferred for components operating at significant high power levels that require the dissipation of the heat generated during the operation of the electrical component.

Figure 3:
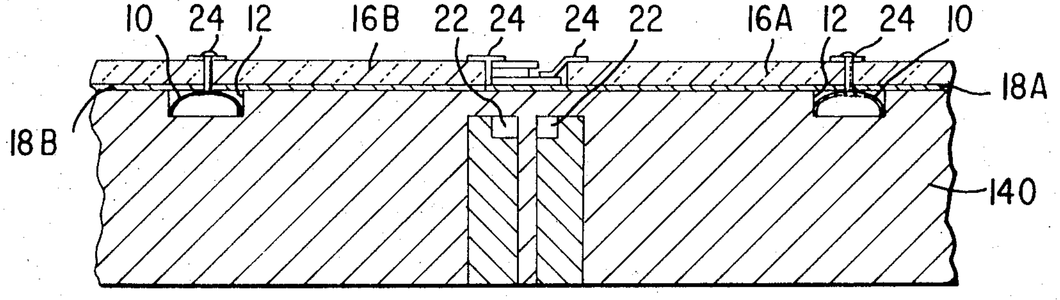
FIG. 3 shows a section, in side elevation, of a component mounted on a heat sink.

Referring now to FIG. 3 there is shown several connectors 10 of the invention in an environment of a heat sink. The connectors 10 are shown mounted in a housing base 140 within slots 12 suitably dimensioned to keep the connector 10 in captured position when the electrical substrates 16A and 16B are placed thereover. Coolant channels 22 are formed in the base 140 to carry suitable coolant fluids. The dip brazed pieces merely serve the purpose of forming the channels since there is no way of machining the channels, as shown, without later closing the machining slots. The substrate 16B and 16A having metalized bottom surfaces 18A and 18B are shown in place on the base 140. A plurality of connecting tabs 24 provide connection between the circuits on the substrates. The tabs serve to provide contact between the circuits on the two substrates.

Figure 4:
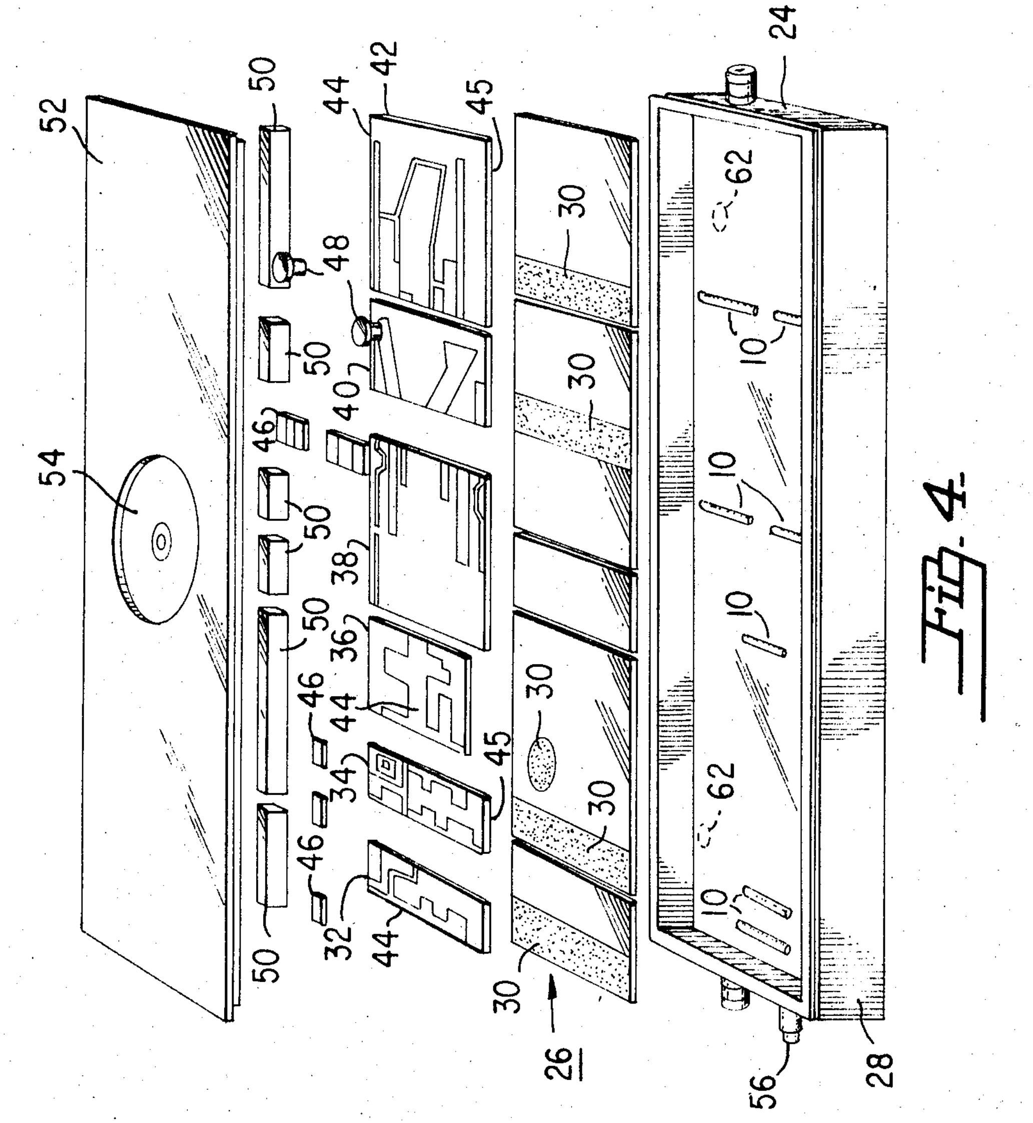
FIG. 4 is an exploded view of an assembly of a module configuration utilizing the electrical connector together with the heat sink.

Referring to FIG. 4 there is shown an exploded view of several components of a module of a 10 watt S-Band Microwave Integrated Circuit (MIC) amplifier. It shows particularly the relationship of components to an electrical connector 10 made in accordance with this invention. The housing 24 is generally a hollow elongated parallelepiped of aluminum having a bottom wall, 28 beneath the dotted-line on housing 24, corresponding to bases 14 and 140 as described with respect to FIGS. 1, 2, and 3. In the base 28 of housing 24 a plurality of slots 12 are each provided with an electrical connector 10 positioned to provide an electrical ground between the components of the module.

A plurality of trays 26 placed over the base 28 permit mounting the various components for pre-assembly use such as handling and testing. These trays serve in the assembled module as the ground plane by suitable connection to the metalized bottom of the substrate. The trays are made of type 46-alloy (46 percent nickel and 54 percent iron) which matches the coefficient of expansion of a substrate made of ceramic. Copper inserts 30 in the trays serve to provide a good heat conductor in the region of the trays directly beneath heat dissipating elements (transistors and varactors) to serve as a good thermal path to the heat sink. The copper inserts 30 are arranged to bridge the junction of the substrates so as to assure both a good electrical connection between the metalized substrates as well as a good thermal path from the circuit components to the heat sink.

The transistors and varactors are thus mounted on the copper portions 30 to provide a good heat path to the coolant that flows in channels that are in the base under the copper parts 30.

A plurality of ceramic substrates 32, 34, 36, 38, 40, 42, shown in relative position above the trays 26 are provided with metal edges 45 for the purpose of making a circuit connection from the top surface to the ground plane in contact with the bottom surface of the substrate. The bottom surfaces of the substrates are completely metalized. Thus the metallic layers (18A and 18B) serve as the ground plane of the substrate. Edge metalization is provided only in specific regions where it is necessary to make a connection from the circuit on top of the substrate to the ground plane metalization underneath the substrate.

Each substrate is provided with printed wiring patterns, such as indicated at 44, for electrical conductive paths to components such as transistors 46 and varactor diodes 48. Side rails 50 are positioned adjacent to the substrates to hold the substrates and their components in position. A cover 52 is provided with a vent and final closure hold 54. When the components are assembled the module 24 will be in operative form. Appropriate external connections are made as by the DC-input terminal 56, the RF-input 58, and the RF-output 60. The coolant ports 62 corresponding to the coolant channels 22 (FIG. 3) conduct the coolant into and out of the modules. The complete underside portion of each substrate is metalized to form the ground plane of the substrate as previously explained.

When the components are fully seated in the housing 24, the connectors 10 will have been deformed from the arcuate shape shown in FIG. 1 to the deformed shape as shown in FIG. 2. As previously described, an electrical connector made in accordance with this invention will automatically adjust itself to dimensional tolerance variations that may occur in any various components of the assembly. The connector is resilient to respond to the pressures or forces that will be exerted on it and yet sufficiently rigid to withstand shock.

What is claimed is:

1. An electrical connector assembly for engaging a substantially planar mating electrical conductor device, comprising;

a. a strip of thin, deformable, resilient metal formed generally in an arc, said strip having transverse and longitudinal edges and the crown portion of said strip extending longitudinally thereof;

b. a metallic base structure;

c. a slot formed in the surface of said base structure with side walls substantially parallel to each other and perpendicular to said surface and a floor intersecting said side walls;

d. said strip being resiliently positioned in said slot such that said longitudinal edges nest at the respective intersections of said side walls and floor and said crown portion protrudes from said slot above said surface;

e. the respective dimensions of said slot and said strip being such that said substantially planar mating electrical conductor device placed against said base structure over said strip deforms said strip so that said crown portion is deformed into planar form contiguous with said device and the respective longitudinal edge portions of said strip are pressed against a respective one of said side walls, whereby electrical contact is made by said strip between said structures and said mating device.

2. An electrical connector assembly in accordance with claim 1 wherein said strip consists essentially of an alloy having 1.9 percent beryllium, 97.9 percent copper and 0.2 percent cobalt.

3. An electrical connector assembly in accordance with claim 2 wherein said strip is 0.0006 inches thick.

4. An electrical connector assembly in accordance with claim 3 wherein said strip is heat treated to a temperature of 320° C., said strip being restrained in said arcuate form during said treatment.

5. An electrical connector assembly according to claim 1 wherein said base structure is adapted to function as a heat sink for a module having heat dissipating components mounted thereon, said structure having a plurality of coolant channels disposed in close proximity to said heat dissipating components.

* * * * *